(12) United States Patent
Yamamoto et al.

(10) Patent No.: US 6,587,232 B1
(45) Date of Patent: Jul. 1, 2003

(54) IMAGE PRINTING APPARATUS

(75) Inventors: Yuji Yamamoto, Wakayama (JP); Tomoyuki Ishii, Uchita-cho (JP)

(73) Assignee: Noritsu Koki Co., Ltd., Wakayama-ken (JP)

( * ) Notice: Subject to any disclaimer, the term of this patent is extended or adjusted under 35 U.S.C. 154(b) by 0 days.

(21) Appl. No.: 09/319,157

(22) PCT Filed: Sep. 30, 1998

(86) PCT No.: PCT/JP98/04393

§ 371 (c)(1),
(2), (4) Date: May 28, 1999

(87) PCT Pub. No.: WO99/17160

PCT Pub. Date: Apr. 8, 1999

(30) Foreign Application Priority Data

Oct. 1, 1997  (JP) ............................................. 9-269010

(51) Int. Cl.$^7$ ................................................ H04N 1/04
(52) U.S. Cl. ........................................ 358/498; 358/496
(58) Field of Search ................................ 358/498, 496, 358/296, 401, 487, 505, 506, 298; 271/4.01, 109, 209, 226; 347/263, 245

(56) References Cited

U.S. PATENT DOCUMENTS 4,920,431 A * 4/1990 Ogura et al. ................. 358/496
5,764,382 A * 6/1998 Shiraishi ...................... 358/496
5,825,513 A * 10/1998 Hasegawa .................... 358/498

* cited by examiner

*Primary Examiner*—Cheukfan Lee
(74) *Attorney, Agent, or Firm*—Jordan and Hamburg LLP (57) ABSTRACT

Image printing apparatus including an exposure head for making a line-by-line exposure of a light-sensitive material, a positioning member facing the exposure head and having a projecting part situated on an optical axis of the exposure head on a side facing the exposure head, a first transfer path on an upstream side of the positioning member to transfer the material toward the positioning member, and a second transfer path on a downstream side of the positioning member to transfer the material downstream. The projecting part is located on a side closer to the exposure head than the intersection between an extension of the first transfer path and the optical axis and the intersection of an extension of the second transfer path and the optical axis. The positioning member has on its upstream side an inclined portion for guiding a forward end of the material transferred from the first transfer path onto the projecting part.

26 Claims, 8 Drawing Sheets

IMAGE PRINTING APPARATUS

TECHNICAL FIELD

This invention relates to an image exposure apparatus having an exposure unit for exposing a light-sensitive material, such as photographic printing paper, line by line as the material is transferred in a specified direction.

BACKGROUND ART

Figure 11:
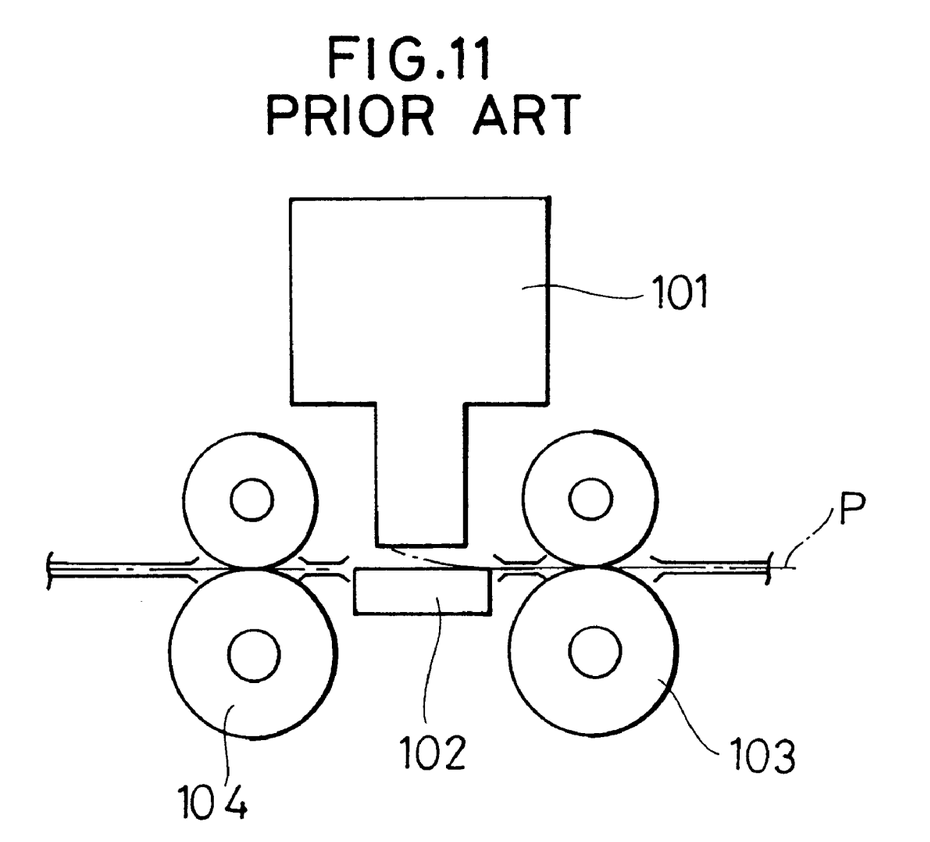
FIG. 11 is a diagram showing a principal portion of a conventional image printing system.

Conventionally, an image exposure apparatus of this kind comprises an exposure unit 101 including a lead lanthanum zirconate titanate (PLZT) device, for instance, a positioning member 102 disposed face to face with the exposure unit 101, a first pair of transfer rollers 103 located upstream of the exposure unit 101 and a second pair of transfer rollers 104 located downstream of the exposure unit 101 as shown in FIG. 11, for example, wherein image exposure operation is performed by exposing a light-sensitive material P like photographic printing paper which is gripped between the first transfer rollers 103 and between the second transfer rollers 104 and transferred over the top surface of the positioning member 102 with a digital image projected line by line by the exposure unit 101. The PLZT device is a shutter array formed of a transparent ferroelectric ceramic material, which is obtained by adding lanthanum to lead zirconate titanate, and utilizes an electro-optical effect of the material.

In the image exposure apparatus thus constructed, the light-sensitive material P would scarcely lift upward apart from the positioning member 102 by between the first transfer rollers 103 on the upstream side and the second transfer rollers 104 on the downstream side, where the light-sensitive material P is gripped, even when the light-sensitive material is somewhat curled, because it is pulled by the transfer roller pairs 103, 104 on both sides. It is therefore possible to properly expose the light-sensitive material P.

If, however, the light-sensitive material P is curled even slightly, its forward portion would lift apart from the positioning member 102, creating an out-of-focus condition and making it impossible to properly expose this portion, because the forward portion of the light-sensitive material P is not gripped by the second transfer roller pair 104 on the downstream side. Similarly, if the light-sensitive material P is curled even slightly, its rear portion would lift apart from the positioning member 102, creating an out-of-focus condition and making it impossible to properly expose this portion, because the rear portion of the light-sensitive material P is not gripped by the first transfer roller pair 103 on the upstream side. In particular, the exposure unit which exposes line by line generally has a large depth of focus and, in most cases, maximum permissible displacement of the light-sensitive material along the optical axis of the exposure unit is only about ±0.1 mm so that the exposure operation is likely to be affected by the curl.

Thus, it has often been necessary in the image exposure apparatus of the prior art to cut and discard the forward and rear portions of the light-sensitive material P, developing a problem that losses of the light-sensitive material are caused. A further problem has been that if the forward and rear portions were to be cut, processing capability would be decreased by as much as the time required for cutting operation.

This invention has been made in consideration of the aforementioned situations. It is therefore an object of the invention to provide image exposure apparatus which can properly expose forward and rear portions of a light-sensitive material even when it is curled.

SUMMARY OF THE INVENTION

To achieve the aforementioned object, an image exposure apparatus according to the invention comprises an exposure device for making line-by-line exposures of a light-sensitive material on an optical axis, a positioning member provided at a position facing said exposure device and having a projecting part situated on said optical axis on a side facing said exposure device, a first transfer path provided on an upstream side of said positioning member to transfer said light-sensitive material toward said positioning member, and a second transfer path provided on a downstream side of said positioning member to transfer said light-sensitive material which has been transferred passing over said positioning member further downstream, wherein the projecting part of said positioning member is located on a side closer to said exposure device than the point of intersection of an extension of said first transfer path and said optical axis and the point of intersection of an extension of said second transfer path and said optical axis, and said positioning member has on its upstream side an inclined portion for guiding a forward end of said light-sensitive material transferred from said first transfer path onto said projecting part.

According to this construction, the projecting part of the positioning member is located on the side closer to the exposure device than the point of intersection of the extension of the first transfer path and the optical axis and, therefore, a forward portion of the light-sensitive material having been transferred by the first transfer path is brought into contact with the inclined portion on the upstream side of the positioning member, guided onto the projecting part and exposed by the exposure device.

Further, a rear portion of the light-sensitive material is situated on the side closer to the exposure device than the point of intersection of the extension of the second transfer path and the optical axis when the light-sensitive material having been transferred by the first transfer path is passed to the second transfer path and transferred further downstream. Thus, the rear portion of the light-sensitive material is prevented from lifting toward the exposure device and held in contact with the projecting part so that the rear portion is exposed by the exposure device as it passes over the projecting part.

Consequently, proper exposures are made at both the forward and rear portions of the light-sensitive material even when it is curled.

Also, an image exposure apparatus according to the invention comprises an exposure device for making line-by-line exposures of a light-sensitive material on an optical axis, a positioning member provided at a position facing said exposure device, a first transfer path provided on an upstream side of said positioning member to transfer said light-sensitive material toward said positioning member, a second transfer path provided on a downstream side of said positioning member to transfer said light-sensitive material having passed over said positioning member further downstream, and uplift-restraining means for preventing said light-sensitive material from lifting from said positioning member toward said exposure device.

According to this construction, the light-sensitive material transferred by the first transfer path and the second transfer path is kept from lifting from the positioning member toward the exposure device by the uplift-restraining means. As a consequence, the whole of the light-sensitive material including its forward and rear portions is brought into contact with the positioning member, and proper exposures are made over the entire light-sensitive material.

BRIEF DESCRIPTION OF THE DRAWINGS

FIGS. 2A, 2B, and 2C are diagrammatic representations of conditions in which a light-sensitive material is transferred over a projecting part of a positioning member in the image printing system shown in FIG. 1.

FIGS. 4A, 4B, and 4C are diagrammatic representations of conditions in which a light-sensitive material is transferred over a projecting part of a positioning member in the image printing system shown in FIG. 3, wherein

BEST MODES FOR CARRYING OUT THE INVENTION

Figure 1:
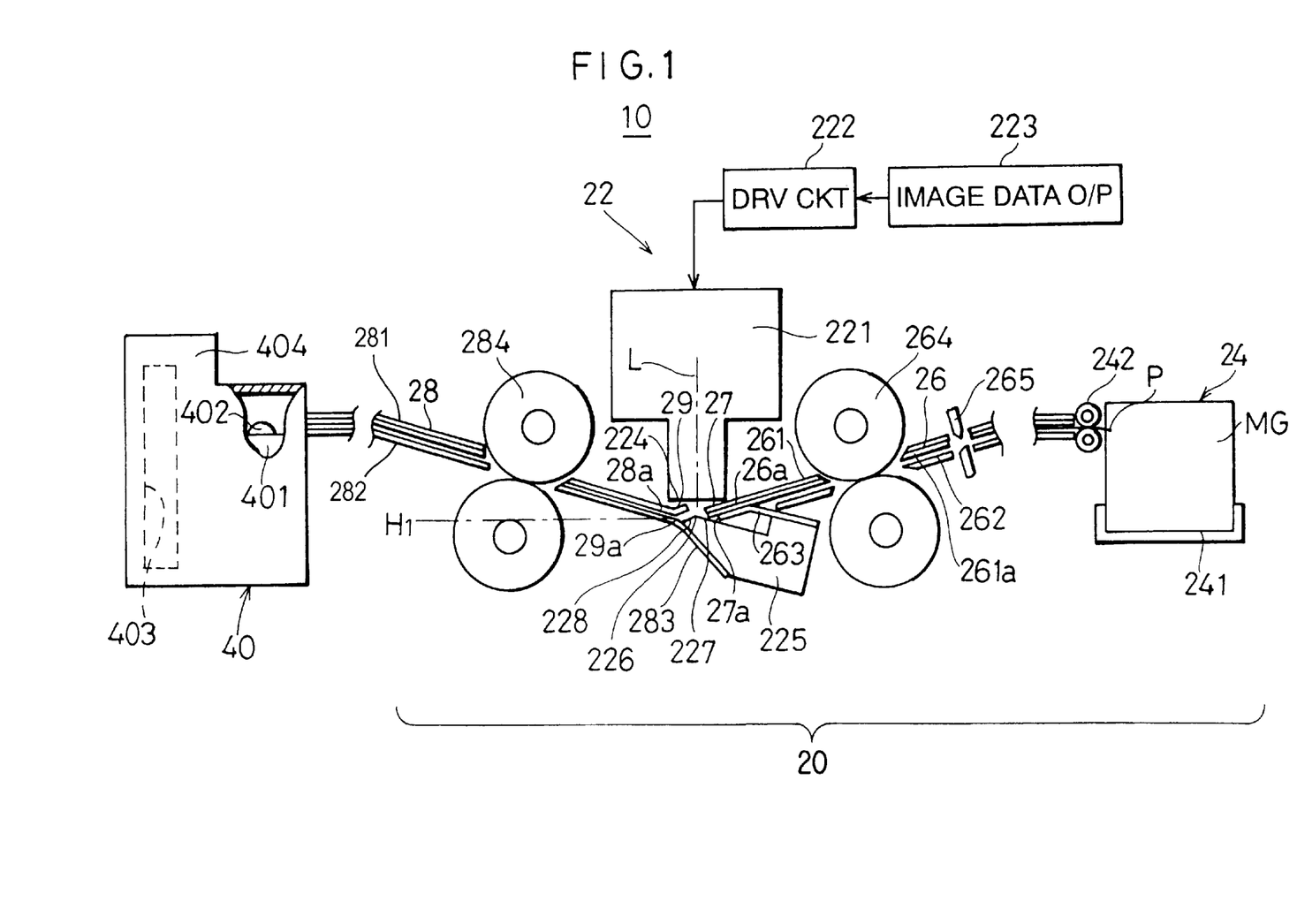
FIG. 1 is a diagram showing the general construction of an image printing system according to a first embodiment of the invention.

FIG. 1 is a diagram showing the general construction of an image printing system 10 according to a first embodiment of the invention. Referring to this Figure, the image printing system 10 comprises exposure section 20 which exposes a light-sensitive material like photographic printing paper with an image and a developing section 40 which develops the light-sensitive material exposed with the image.

The exposure section 20 is for exposing the light-sensitive material P like photographic printing paper with a digital image. It comprises an image transfer unit 22, a light-sensitive material feeder 24 which is located upstream (right side as illustrated) of the image transfer unit 22 and feeds the light-sensitive material P like the photographic printing paper to the image transfer unit 22, a first transfer path 26 for transferring the light-sensitive material P fed from the side of the light-sensitive material feeder 24 toward the image transfer unit 22, and a second transfer path 28 for transferring the light-sensitive material P exposed in the image transfer unit 22 toward the developing section 40.

The image transfer unit 22 includes an exposure head 221 formed of a PLZT device which serves as an exposure device for converting image data into light signals and outputting them onto the light-sensitive material P, a driving circuit 222 for driving the exposure head 221, an image data output unit 223 for outputting the image data to the driving circuit 222, and a positioning member 225 for regulating the position of passage of the light-sensitive material P. As previously stated, the PLZT device is a shutter array which is formed of a transparent ferroelectric ceramic material obtained by adding lanthanum to lead zirconate titanate and utilizes an electro-optical effect of the material.

The image data output unit 223 performs prescribed image processing operation on image data obtained by reading a film image, for instance, with an image pickup device like a charge-coupled device (CCD) or on image data delivered from an external system like a personal computer, and outputs the processed image data line by line or as a succession of a few lines.

The positioning member 225 is made into a shape having a projecting part 226, a first inclined portion 227 formed on an upstream side (right side as illustrated) of the projecting part 226 and a second inclined portion 228 formed on a downstream side (left side as illustrated) of the projecting part 226, the projecting part 226 being disposed such that it is located on an optical axis L of the exposure head 221 and, as will be described later, the light-sensitive material P passes over the projecting part 226 in contact therewith. The exposure head 221 performs an exposure operation on the light-sensitive material P passing over the projecting part 226 by converting the image data into light signals and outputting the light signals line by line or as a succession of a few lines.

The light-sensitive material feeder 24 includes a cartridge rack 241 and a pull-out roller pair 242 for pulling out the elongate light-sensitive material P which is wound in a cartridge MG located on the cartridge rack 241 and advancing the light-sensitive material P into the first transfer path 26.

Constructed of an upper guide plate 261 and a lower guide plate 262 which are arranged face to face with each other, the first transfer path 26 is disposed in such a way that it slopes toward the positioning member 225. More particularly, the first transfer path 26 is disposed such that it is inclined downward from right to left as illustrated, as the exposure head 221 is installed with its head surface 224 directed downward in this embodiment.

A portion of the lower guide plate 262 is removed at a downstream terminal portion 26a of the first transfer path 26, and a tough flexible sheet element 263 attached to the positioning member 225 is disposed at the removed portion of the lower guide plate 262. This flexible sheet element 263 is arranged such that its portion directly facing the upper guide plate 261 is in contact with the upper guide plate 261. A protective element 261a formed of velvet, for instance, is adhered to an inside surface of the upper guide plate 261 to protect the light-sensitive surface of the light-sensitive material P.

An extreme part 27 of the downstream terminal portion 26a is located on the upstream side (right side as illustrated) of the projecting part 226 of the positioning member 225 at a position in the proximity of the projecting part 226 so that an outlet 27a for the light-sensitive material P is located in the same plane as a plane $H_1$ containing the projecting part 226 of the positioning member 225. With this arrangement, the projecting part 226 of the positioning member 225 is situated closer to the exposure head 221 than the point of intersection of a downstream extension of the first transfer path 26 and the optical axis L of the exposure head 221. To discriminate the extreme part 27 of the downstream terminal portion 26a from the first transfer path 26 in terminology, the extreme part 27 is referred to as an extended part formed at an end of the first transfer path 26.

The first transfer path 26 is provided with a first pair of transfer rollers 264 for intermittently transferring the light-sensitive material P in specific steps and a cutter unit 265 located upstream of the first transfer rollers 264. With this arrangement, the light-sensitive material P pulled out of the cartridge MG is cut into a specified length and transferred by the first transfer roller pair 264 toward the exposure head 221 on the downstream side.

Constructed of an upper guide plate 281 and a lower guide plate 282 which are arranged face to face with each other, the second transfer path 28 is disposed in such a way that it slopes toward the positioning member 225. More particularly, the second transfer path 28 is disposed such that it is inclined upward from right to left as illustrated, as the exposure head 221 is installed with its head surface 224 directed downward in this embodiment.

A portion of the lower guide plate 282 is removed at an upstream terminal portion 28a of the second transfer path 28, and a tough flexible sheet element 283 attached to the positioning member 225 is disposed at the removed portion of the lower guide plate 282. This flexible sheet element 283 is arranged such that its portion directly facing the upper guide plate 281 is in contact with the upper guide plate 281. A protective element 281a formed of velvet, for instance, is adhered to an inside surface of the upper guide plate 281 to protect the light-sensitive surface of the light-sensitive material P.

An extreme part 29 of the upstream terminal portion 28a of the upper guide plate 281 is partly bent toward the head surface 224 where the upper guide plate 281 is situated below the head surface 224 so that an inlet 29a for the light-sensitive material P is located in the same plane as the plane $H_1$ containing a top surface of the projecting part 226 of the positioning member 225. With this arrangement, the projecting part 226 of the positioning member 225 is situated closer to the exposure head 221 than the point of intersection of an upstream extension of the second transfer path 28 and the optical axis L of the exposure head 221. To discriminate the extreme part 29 of the upstream terminal portion 28a from the second transfer path 28 in terminology, the extreme part 29 is referred to as an extended part formed at an end of the second transfer path 28.

The second transfer path 28 is provided with a second pair of transfer rollers 284 for intermittently transferring the light-sensitive material P in specific steps. The light-sensitive material P exposed by the exposure head 221 is transferred by the second transfer roller pair 284 toward the developing section 40.

Figure 2A:
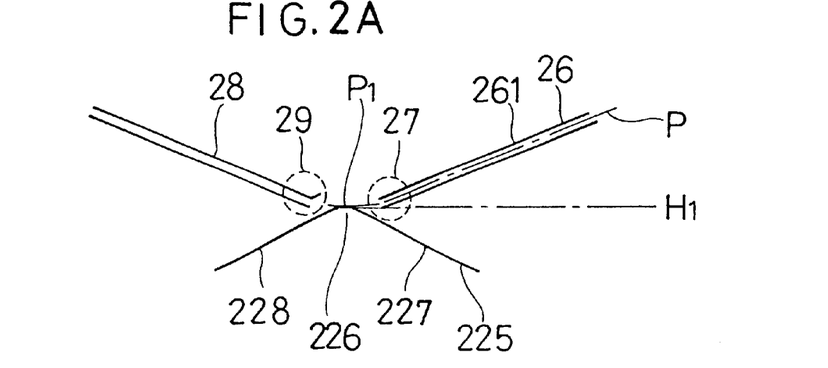
FIG. 2A is a diagram showing a condition in which a forward portion of the light-sensitive material is held in contact with the projecting part of the positioning member.
Figure 2B:
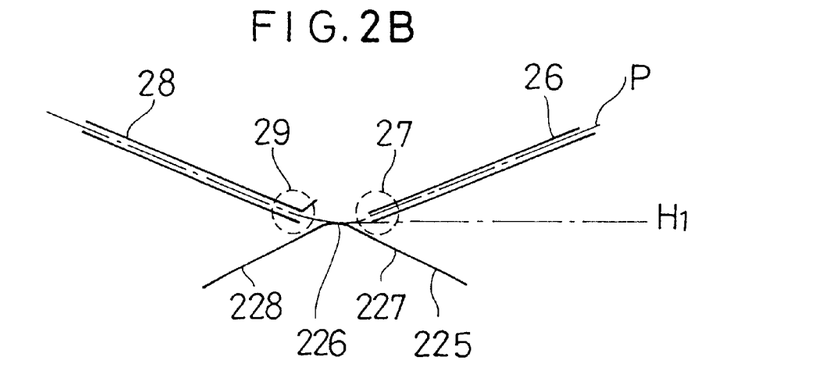
FIG. 2B is a diagram showing a condition in which a rear portion of the light-sensitive material is held in contact with the projecting part of the positioning member.
Figure 2C:
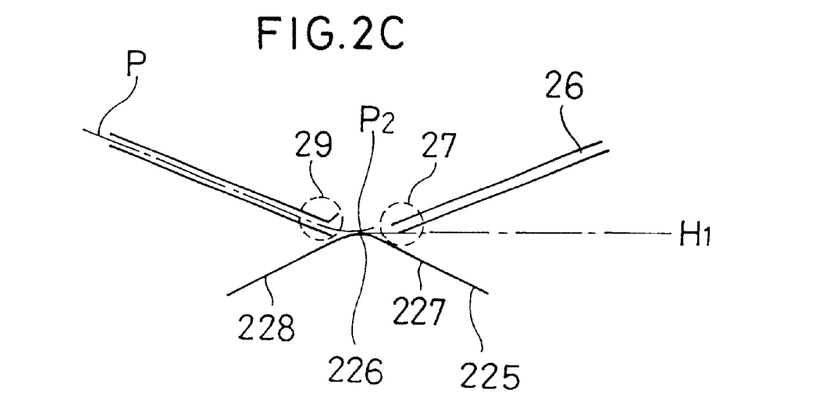
FIG. 2C is a diagram showing a condition in which a middle portion of the light-sensitive material excluding its forward portion and rear portion is held in contact with the projecting part of the positioning member.

As the first transfer path 26 and the second transfer path 28 are formed as described above in the image printing system 10 of the foregoing construction, the light-sensitive material P passes over the projecting part 226 of the positioning member 225 in conditions shown in FIGS. 2A to 2C.

Firstly, since the light-sensitive material P is transferred downslope leftward, a forward portion $P_1$ of the light-sensitive material P fed through the first transfer path 26 has a large angle of approach with respect to the projecting part 226, and because the projecting part 226 is situated closer to the exposure head 221 than the point of intersection of the extension of the first transfer path 26 and the optical axis L of the exposure head 221, the forward portion $P_1$ of the light-sensitive material P goes into contact with the first inclined portion 227 of the positioning member 225 and is guided along its inclined surface toward the projecting part 226, as shown in FIG. 2A. Therefore, out-of-focus conditions will not occur at the forward portion $P_1$ of the light-sensitive material P as well, and a proper exposure will be obtained. Furthermore, since the forward portion $P_1$ is kept from lifting upward from the projecting part 226 (i.e., toward the exposure head 221) by the extreme part 27, the forward portion $P_1$ is always held in contact with the projecting part 226 as it passes over the projecting part 226 no matter in which direction the light-sensitive material P is curled (whether it is curled to form an upward- or downward-directed swelling). The extreme part 27 is not absolutely essential, however, for keeping the forward portion $P_1$ of the light-sensitive material P in contact with the projecting part 226. This extreme part 27 may be disposed such that its outlet 27a is positioned below the plane $H_1$ containing the projecting part 226 (i.e., on the side opposite to the head surface 224 with respect to the plane $H_1$) as long as the extreme part 27 is situated within a range where it can guide the light-sensitive material P which has been transferred through the first transfer path 26 onto the projecting part 226 along the inclined surface of the first inclined portion 227.

Even when the light-sensitive material P is significantly curled, its curled portion is pressed and temporarily straightened since the flexible sheet element 263 of the downstream terminal portion 26a of the first transfer path 26 is held in contact with the upper guide plate 261 in this embodiment. Thus, the curled portion is brought into contact with the projecting part 226 in a reliable fashion.

When the forward portion $P_1$ of the light-sensitive material P has passed from the first transfer path 26 into the second transfer path 28 and its rear portion $P_2$ has been sent out from the first transfer path 26, the light-sensitive material P is transferred upward to the left. Accordingly, the rear portion $P_2$ of the light-sensitive material P has a large angle of departure with respect to the projecting part 226, and because the projecting part 226 is situated closer to the exposure head 221 than the point of intersection of the extension of the second transfer path 28 and the optical axis L of the exposure head 221, the rear portion $P_2$ is always held in contact with the projecting part 226 as it passes over the projecting part 226, as shown in FIG. 2C. Therefore, out-of-focus conditions will not occur even at the rear portion $P_2$ of the light-sensitive material P, and a proper exposure will be obtained. Furthermore, since the rear portion $P_2$ is kept from lifting upward from the projecting part 226 (i.e., toward the exposure head 221) by the extreme part 29, the rear portion $P_2$ is always held in contact with the projecting part 226 as it passes over the projecting part 226 no matter in which direction the light-sensitive material P is curled. The extreme part 29 is not absolutely essential, however, for keeping the rear portion $P_2$ of the light-sensitive material P in contact with the projecting part 226. This extreme part 29 may be disposed such that its inlet 29*a* is positioned below the plane $H_1$ containing the projecting part 226 (i.e., on the side opposite to the head surface 224 with respect to the plane $H_1$) as long as the extreme part 29 is situated within a range where it can receive the light-sensitive material P which has been transferred through the first transfer path 26.

Even when the light-sensitive material P is significantly curled, its curled portion is pressed and temporarily straightened since the flexible sheet element 283 of the upstream terminal portion 28*a* of the second transfer path 28 is held in contact with the upper guide plate 281 in this embodiment. Thus, the rear portion $P_2$ is brought into contact with the projecting part 226 in a reliable fashion. To discriminate the extreme part 29 of the upstream terminal portion 28*a* from the second transfer path 28 in terminology, the extreme part 29 is referred to as the extended part formed at the end of the second transfer path 28 in this embodiment.

When the light-sensitive material P is transferred as it spans between the first transfer path 26 and the second transfer path 28, or when a middle portion of the light-sensitive material P excluding its forward portion $P_1$ and rear portion $P_2$ is transferred, the light-sensitive material P is kept from lifting upward from the projecting part 226 by the extreme part 27 of the first transfer path 26 and the extreme part 29 of the second transfer path 28 and held in contact with the projecting part 226 as shown in FIG. 2B. Therefore, a proper exposure is obtained at the middle portion as well. This means that the extreme part 27 (extended part) of the downstream terminal portion 26*a* and the extreme part 29 (extended part) of the upstream terminal portion 28*a* constitute contact means for preventing the light-sensitive material P from lifting upward toward the exposure head 221.

If the whole of the light-sensitive material P including its forward portion $P_1$ and rear portion $P_2$ is properly exposed as described above, it becomes unnecessary to cut and throw away neither the forward portion $P_1$ or rear portion $P_2$ of the light-sensitive material P so that losses of the light-sensitive material P can be reduced. Furthermore, it becomes possible to reduce processing time of the system because the time required for the cutting operation becomes unnecessary. Moreover, it becomes possible to use a lens having a small depth of focus in the exposure head 221 and improve its capability of exposing the light-sensitive material P.

The developing section 40 comprises a plurality of processing tanks 401 filled with processing solutions for developing the light-sensitive material P which has been exposed with images in the image transfer unit 22, transfer means 402 for transferring the light-sensitive material P in the processing tanks 401, a drying chamber 403 for drying the light-sensitive material P discharged from the processing tanks 401, and a light-sensitive material delivery section 404 for ejecting the dried light-sensitive material P onto vertically arranged trays which are not illustrated.

The image printing system 10 constructed as described above is controlled by a controller formed of a central processing unit (CPU), a read-only memory (ROM) in which a specific program is stored, a random-access memory (RAM) in which data is temporarily stored, and so on, and operates generally in the following manner.

Firstly, when a start switch is turned on, the light-sensitive material P is continuously pulled out of the cartridge MG loaded on the cartridge rack 241 and transferred downstream through the first transfer path 26 and successively cut into a specified size by the cutter unit 265. Cut pieces of the light-sensitive material P are successively transferred to the image transfer unit 22, where each piece of the light-sensitive material P transferred over the projecting part 226 of the positioning member 225 is exposed by the exposure head 221. More specifically, as the light-sensitive material P is transferred intermittently in specific steps, the image data is output from the exposure head 221 in the form of light signals line by line or as a succession of a few lines onto the light-sensitive material P in synchronism with its movement to thereby make an exposure of the light-sensitive material P. This exposure operation is performed properly on the whole of the light-sensitive material P including its forward portion $P_1$ and rear portion $P_2$ as stated above. Upon completion of the exposure operation, the light-sensitive material P is transferred to the developing section 40 through the second transfer path 28. The light-sensitive material P is then developed and ejected to the light-sensitive material delivery section 404.

Although the exposure of the light-sensitive material P is made as it passes through the image transfer unit 22 downstream in the above-described first embodiment, it may be modified so as to once transfer the light-sensitive material P to the downstream side by passing it through the image transfer unit 22 and then expose the light-sensitive material P while reversing it to the upstream side.

Furthermore, although some portions of the lower guide plates 262, 282 are taken away at the 26*a* of the first transfer path 26 and at the upstream terminal portion 28*a* of the second transfer path 28 and the flexible sheet elements 263, 283 are disposed at these portions, respectively in the above-described first embodiment, these flexible sheet elements 263, 283 are not absolutely essential. It is possible to adopt a construction made up of the upper guide plates 261, 281 and the lower guide plates 262, 282 only without using the flexible sheet elements 263, 283.

Furthermore, although the light-sensitive material P is cut by the cutter unit 265 disposed in the first transfer path 26 and the exposure operation is performed on the cut pieces of the light-sensitive material P in the above-described first embodiment, it may be modified such that the cutter unit 265 is disposed in the second transfer path 28 and the light-sensitive material P is cut after it has gone through the exposure operation.

Figure 3:
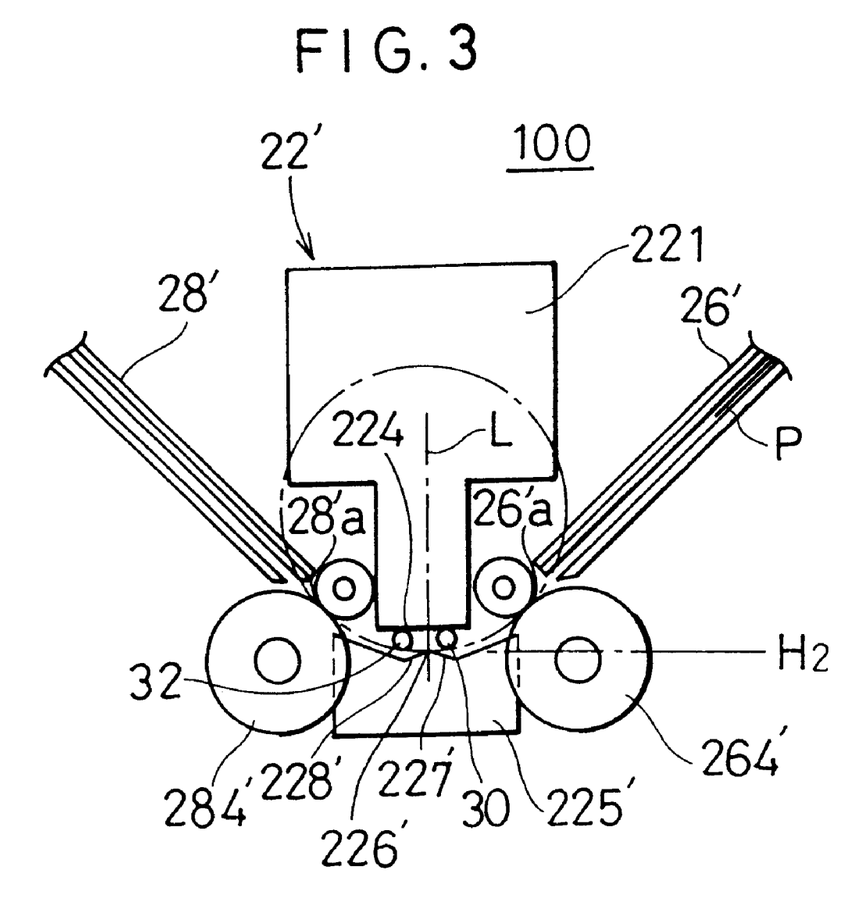
FIG. 3 is a diagram showing only a principal portion of an image printing system according to a second embodiment of the invention.

FIG. 3 is a diagram showing only a principal portion of an image printing system 100 according to a second embodiment of the invention. Since differences of this embodiment as compared to the image printing system 10 of the first embodiment lie only in the construction of the image transfer unit 22 and its surrounding elements and the construction and operation are otherwise basically unchanged, the following discussion deals only with the differences from the image printing system 10. In addition, the same constituent elements are designated by the same reference numerals and a detailed description of such constituent elements is not provided.

Specifically, this image printing system 100 is made such that a positioning member 225' constituting part of an image transfer unit 22' is formed into a symmetrical shape having a projecting part 226', a first inclined portion 227' formed on the upstream side (right side as illustrated) of the projecting part 226' and a second inclined portion 228' formed on the downstream side (left side as illustrated) of the projecting part 226', and the projecting part 226' is situated at a position on an optical axis L of an exposure head 221. Further, a first roller 30 is rotatably mounted beneath a head surface 224 on the upstream side of the positioning member 225' while a second roller 32 is rotatably mounted beneath the head surface 224 on the downstream side of the positioning member 225', wherein the first and second rollers 30, 32 are disposed such that bottom parts of their surfaces lie in the same surface as a plane $H_2$ containing a top surface of the projecting part 226'.

A first transfer path 26' on the upstream side of the exposure head 221 and a second transfer path 28' on its downstream side are disposed such that they have greater angles of inclination than the first and second transfer paths 26, 28 of the first embodiment. A downstream terminal portion 26'a of the first transfer path 26' and an upstream terminal portion 28'a of the second transfer path 28' are situated apart from the head surface 224 of the exposure head 221. A first pair of transfer rollers 264' is provided at the side of the downstream terminal portion 26'a of the first transfer path 26' facing the exposure head 221 while a second pair of transfer rollers 284' is provided at the side of the upstream terminal portion 28'a of the second transfer path 28' facing the exposure head 221. The projecting part 226' of the positioning member 225' is arranged such that it is situated closer to the exposure head 221 than both the point of intersection of an extension of the first transfer path 26' and the optical axis L of the exposure head 221 and the point of intersection of an extension of the second transfer path 28' and the optical axis L of the exposure head 221.

The image printing system 100 of the aforementioned construction is made such that the projecting part 226' of the positioning member 225', the bottom parts of the surfaces of the first and second rollers 30, 32 and the first and second transfer roller pairs 264', 284' are located on a circumference of a small diameter (e.g., 40 mmφ) shown by a chain line, making it possible to properly expose a forward portion $P_1$ and a rear portion $P_2$ of a light-sensitive material P even when the light-sensitive material P is curled to form a swelling of a 40 mmφ diameter directed downward as illustrated, for example.

Figure 4A:
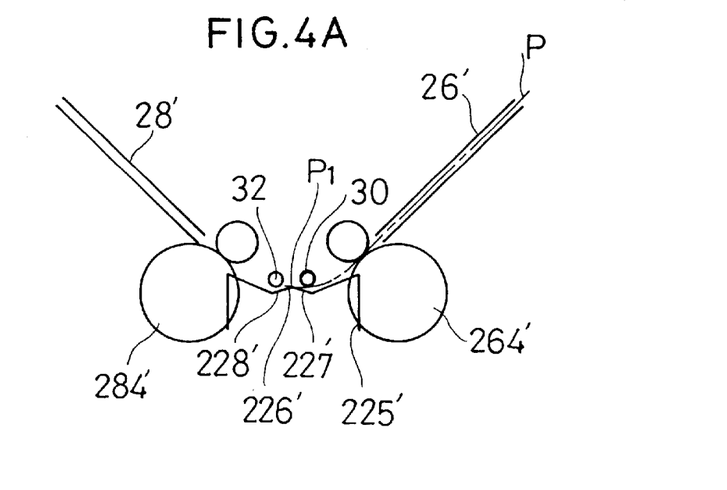
FIG. 4A is a diagram showing a condition in which a forward portion of the light-sensitive material is held in contact with the projecting part of the positioning member.

More particularly, since the light-sensitive material P is transferred from the first transfer path 26' at a large angle of approach with respect to the positioning member 225' and the projecting part 226' of the positioning member 225' is situated closer to the exposure head 221 than the point of intersection of the extension of the first transfer path 26' and the optical axis L of the exposure head 221 in this construction, the forward portion $P_1$ of the light-sensitive material P goes into contact with the first inclined portion 227' of the positioning member 225' and is guided along its inclined surface toward the projecting part 226', as shown in FIG. 4A. Therefore, out-of-focus conditions will not occur even at the forward portion $P_1$ of the light-sensitive material P, and a proper exposure will be obtained. Furthermore, since the forward portion $P_1$ is kept from lifting upward from the projecting part 226' (i.e., toward the exposure head 221) by the first roller 30, the forward portion $P_1$ is always held in contact with the projecting part 226' as it passes over the projecting part 226' no matter in which direction the light-sensitive material P is curled. The first roller 30 is not absolutely essential, however, for keeping the forward portion $P_1$ of the light-sensitive material P in contact with the projecting part 226.

When the first roller 30 is provided, it may be disposed such that the bottom part of its surface is positioned below the plane $H_2$ (i.e., on the side opposite to the head surface 224 with respect to the plane $H_2$) as long as the first roller 30 is situated within a range where the forward portion $P_1$ of the light-sensitive material P transferred through the first transfer path 26' goes into contact with the first roller 30 at a position lower than its rotary shaft.

When the forward portion $P_1$ of the light-sensitive material P has passed from the first transfer path 26' into the second transfer path 28' and its rear portion $P_2$ has been sent out from the first transfer path 26', the light-sensitive material P is transferred upward to the left. Accordingly, the rear portion $P_2$ of the light-sensitive material P has a large angle of departure with respect to the projecting part 226', and because the projecting part 226' is situated closer to the exposure head 221 than the point of intersection of the extension of the second transfer path 28' and the optical axis L of the exposure head 221, the rear portion $P_2$ is always held in contact with the projecting part 226' as it passes over the projecting part 226', as shown in FIG. 4C. Therefore, out-of-focus conditions will not occur at the rear portion $P_2$ of the light-sensitive material P as well, and a proper exposure will be obtained. Furthermore, since the rear portion $P_2$ is kept from lifting upward from the projecting part 226' (i.e., toward the exposure head 221) by the second roller 32, the rear portion $P_2$ is always held in contact with the projecting part 226' as it passes over the projecting part 226' no matter in which direction the light-sensitive material P is curled. The second roller 32 is not absolutely essential, however, for keeping the rear portion $P_2$ of the light-sensitive material P in contact with the projecting part 226'.

When the second roller 32 is provided, it may be disposed such that the bottom part of its surface is positioned below the plane $H_2$ (i.e., on the side opposite to the head surface 224 with respect to the plane $H_2$) as long as the second roller 32 is situated within a range where the forward portion $P_1$ of the light-sensitive material P goes into contact with the second roller 32 at a position lower than its rotary shaft.

Figure 4B:
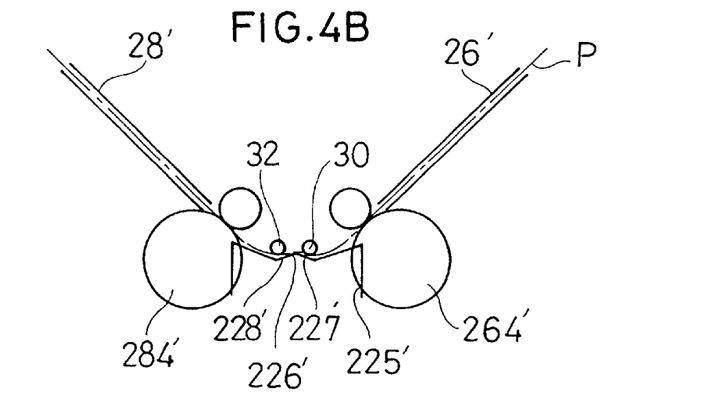
FIG. 4B is a diagram showing a condition in which a rear portion of the light-sensitive material is held in contact with the projecting part of the positioning member.
Figure 4C:
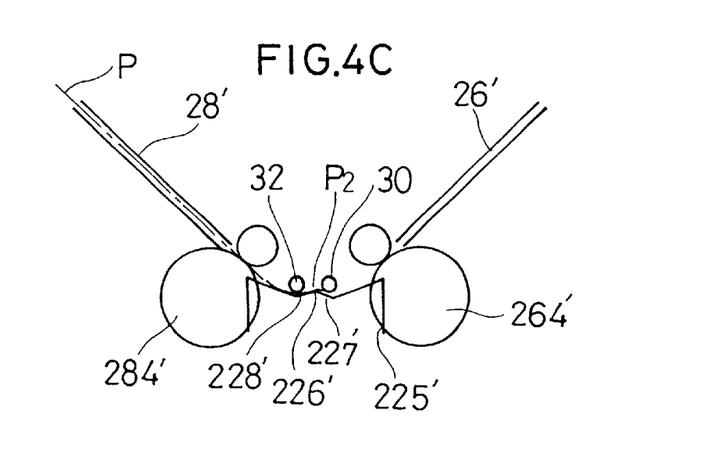
FIG. 4C is a diagram showing a condition in which a middle portion of the light-sensitive material excluding its forward portion and rear portion is held in contact with the projecting part of the positioning member.

When the light-sensitive material P is transferred as it spans between the first transfer path 26' and the second transfer path 28', or when a middle portion of the light-sensitive material P excluding its forward portion $P_1$ and rear portion $P_2$ is transferred, the light-sensitive material P is kept from lifting upward from the projecting part 226' by the first roller 30 and the second roller 32 and held in contact with the projecting part 226' as shown in FIG. 4B. Therefore, a proper exposure is obtained at the middle portion as well. This means that the first and second rollers 30, 32 constitute contact means for preventing the light-sensitive material P from lifting upward toward the exposure head 221.

Although the first transfer rollers 264' are provided at the side of the downstream terminal portion 26'a of the first transfer path 26' facing the exposure head 221 and the second transfer rollers 284' are provided at the side of the upstream terminal portion 28'a of the second transfer path 28' facing the exposure head 221 in the above-described second embodiment, it may be modified such that the first transfer rollers 264' are provided at an upstream position of the first transfer path 26' while the second transfer rollers 284' are provided at a downstream position of the second transfer path 28', and the downstream terminal portion 26'a of the first transfer path 26' is positioned close to the first roller 30 while the upstream terminal portion 28'a of the second transfer path 28' is positioned close to the second roller 32.

Figure 5:
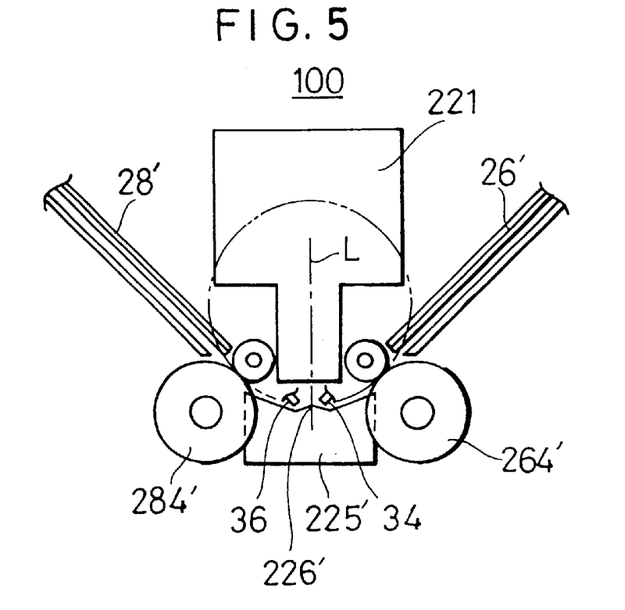
FIG. 5 is a diagram showing a variation of the image printing system shown in FIG. 3.

Furthermore, although the first and second rollers 30, 32 are used as the contact means in the above-described second embodiment, there may be provided first jet means 34 like a jet nozzle on the upstream side of the projecting part 226' and second jet means 36 like a jet nozzle on the downstream side of the projecting part 226' instead of the first and second rollers 30, 32, as shown in FIG. 5, wherein compressed gas, such as air, is supplied from an unillustrated compressed gas source to the first and second jet means 34, 36. In this case, the light-sensitive material P is kept from lifting upward (i.e., toward the exposure head 221) from the projecting part 226' by the gas blown from the first and second jet means 34, 36.

Figure 6:
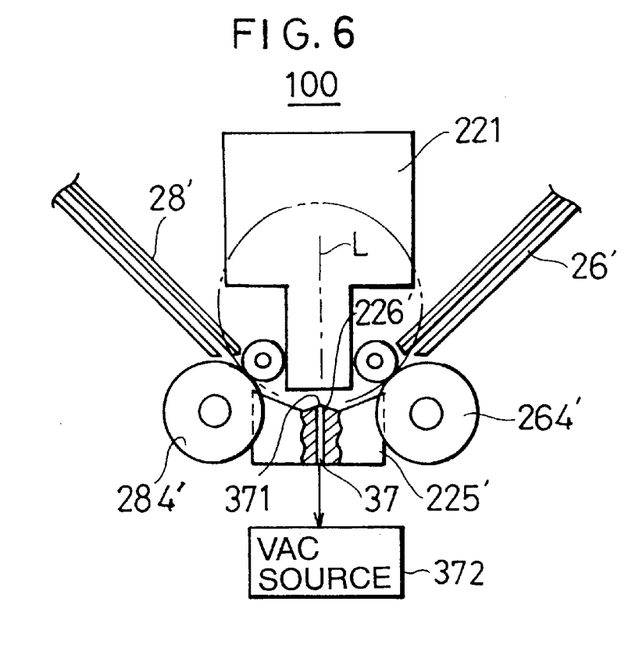
FIG. 6 is a diagram showing another variation of the image printing system shown in FIG. 3.

Furthermore, suction means 37 like a suction nozzle may be provided inside the positioning member 225' instead of the first and second rollers 30, 32 in such a manner that a suction port 371 is located in the projecting part 226' as shown in FIG. 6. A negative pressure is supplied from a vacuum source 372 to the suction means 37. In this case, the light-sensitive material P is sucked by the negative pressure supplied through the suction means 37 and kept from lifting upward (i.e., toward the exposure head 221) from the projecting part 226'. The suction port 371 of the suction means 37 may be separately provided on both the upstream and downstream sides of the projecting part 226'.

Figure 7:
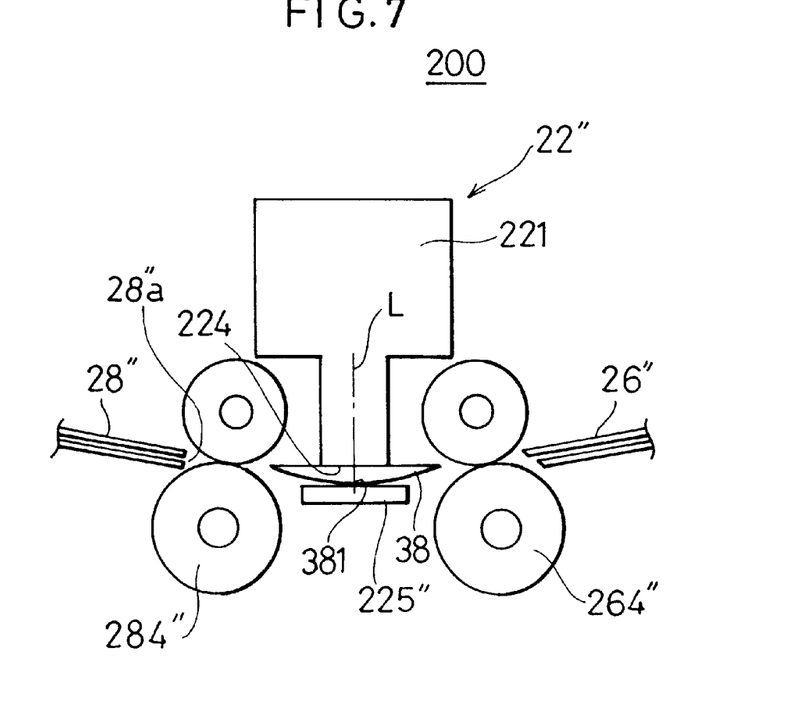
FIG. 7 is a diagram showing only a principal portion of an image printing system according to a third embodiment of the invention.

FIG. 7 is a diagram showing only a principal portion of an image printing system 200 according to a third embodiment of the invention. As is the case with the second embodiment, differences of this embodiment as compared to the image printing system 10 of the first embodiment lie only in the construction of the image transfer unit 22 and its surrounding elements and the construction and operation are otherwise basically unchanged. Therefore, the following discussion deals only with the differences from the image printing system 10. In addition, the same constituent elements are designated by the same reference numerals and a detailed description of such constituent elements is not provided.

Specifically, a positioning member 225" constituting part of an image transfer unit 22" is formed into a flat shape in this image printing system 200. There is provided an uplift-restraining member 38 made of a light-transmitting material in close contact with a head surface 224 of an exposure head 221, wherein one side of the uplift-restraining member 38 facing the positioning member 225" has a curved shape. The uplift-restraining member 38 serving as uplift-restraining means is disposed such that a peak 381 of its curved surface directed toward the positioning member 225" lies on an optical axis L of the exposure head 221.

A first transfer path 26" on the upstream side of the exposure head 221 and a second transfer path 28" on its downstream side are disposed such that they have smaller angles of inclination than the first and second transfer path 26, 28 of the first embodiment. A downstream terminal portion 26"a of the first transfer path 26" and an upstream terminal portion 28"a of the second transfer path 28" are situated apart from the head surface 224 of the exposure head 221. A first pair of transfer rollers 264" is provided at the side of the downstream terminal portion 26"a of the first transfer path 26" facing the exposure head 221 while a second pair of transfer rollers 284" is provided at the side of the upstream terminal portion 281'a of the second transfer path 28" facing the exposure head 221.

Since a forward portion of a light-sensitive material P fed through the first transfer path 26" has a large angle of approach with respect to the positioning member 225" in the image printing system 200 of the aforementioned construction, the light-sensitive material P is fed into a gap between the uplift-restraining member 38 and the positioning member 2251' in a reliable fashion. The light-sensitive material P fed in between the uplift-restraining member 38 and the positioning member 225" is kept from lifting upward from the positioning member 225" (i.e., toward the exposure head 221) by the peak 381 of the uplift-restraining member 38 and, therefore, the whole of the light-sensitive material P including its forward portion $P_1$ and rear portion $P_2$ is properly exposed even when the light-sensitive material P is curled in a certain direction.

Figure 8:
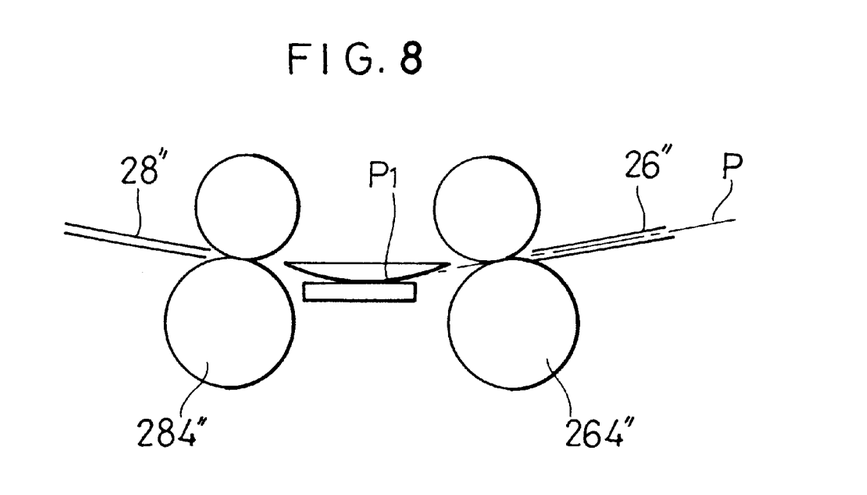
FIG. 8 is a diagram showing a condition in which a light-sensitive material is transferred over a positioning member of the image printing system shown in FIG. 7.

More particularly, since the light-sensitive material P is transferred from the first transfer path 26" at a specified angle of approach with respect to the positioning member 225", the forward portion $P_1$ of the light-sensitive material P is fed into the gap between the uplift-restraining member 38 and the positioning member 225" and the forward portion $P_1$ is kept from lifting upward from the positioning member 225" by the peak 381 of the uplift-restraining member 38, as shown in FIG. 8. Consequently, the forward portion $P_1$ of the light-sensitive material P is brought into contact with a surface area of the positioning member 225" located at a position facing the peak 381, and a proper exposure is made at the forward portion $P_1$. Similarly, the rear portion $P_2$ of the light-sensitive material P and its middle portion excluding the forward portion $P_1$ and rear portion $P_2$ are also brought into contact with the surface area of the positioning member 225" located at the position facing the peak 381, and a proper exposure is made in either case. Since the uplift-restraining member 38 is formed of a light-transmitting material like glass, it does not cause any problem to the exposure of the light-sensitive material P.

Furthermore, since the forward portion $P_1$ of the light-sensitive material P which has gone over the positioning member 225" has a large angle of departure with respect to the positioning member 225", the light-sensitive material P is passed to the second transfer path 28" in a reliable fashion.

Although the first transfer rollers 264" are provided at the side of the downstream terminal portion 26"a of the first transfer path 26" facing the exposure head 221 while the second transfer rollers 284" are provided at the side of the upstream terminal portion 28"a of the second transfer path 28" facing the exposure head 221 in the above-described third embodiment, it may be modified such that the first transfer rollers 264" are provided at an upstream position of the first transfer path 26" while the second transfer rollers 284" are provided at a downstream position of the second transfer path 28", and the downstream terminal portion 26"a of the first transfer path 26" is positioned close to the uplift-restraining member 38 and the upstream terminal portion 28"a of the second transfer path 28" is positioned close to the uplift-restraining member 38.

Figure 9:
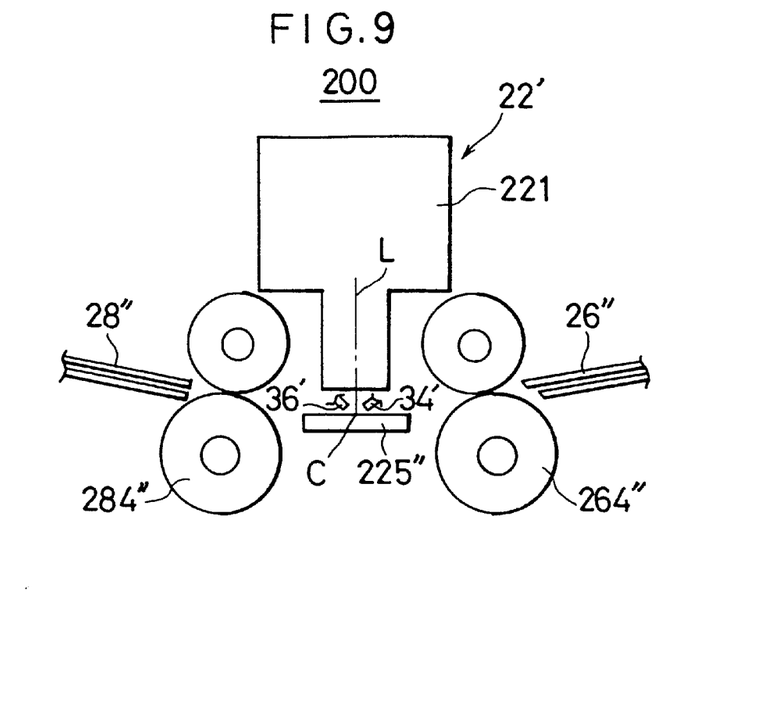
FIG. 9 is a diagram showing a variation of the image printing system shown in FIG. 7.

Furthermore, although the uplift-restraining member 38 made of a light-transmitting material is used in the above-described third embodiment, there may be provided first and second jet means 34', 36' formed of jet nozzles, for example, instead of the uplift-restraining member 38 on upstream and downstream sides of a point C of intersection of the surface of the positioning member 225" and the optical axis L in such a way that outlets of the first and second jet means 34', 36' are directed to the proximity of the point C of intersection, as shown in FIG. 9. Compressed gas, such as air, is supplied from an unillustrated compressed gas source to the first and second jet means 34', 36', and the light-sensitive material P is kept from lifting upward toward the exposure head 221 by the gas blown from the first and second jet means 34', 36'.

Figure 10:
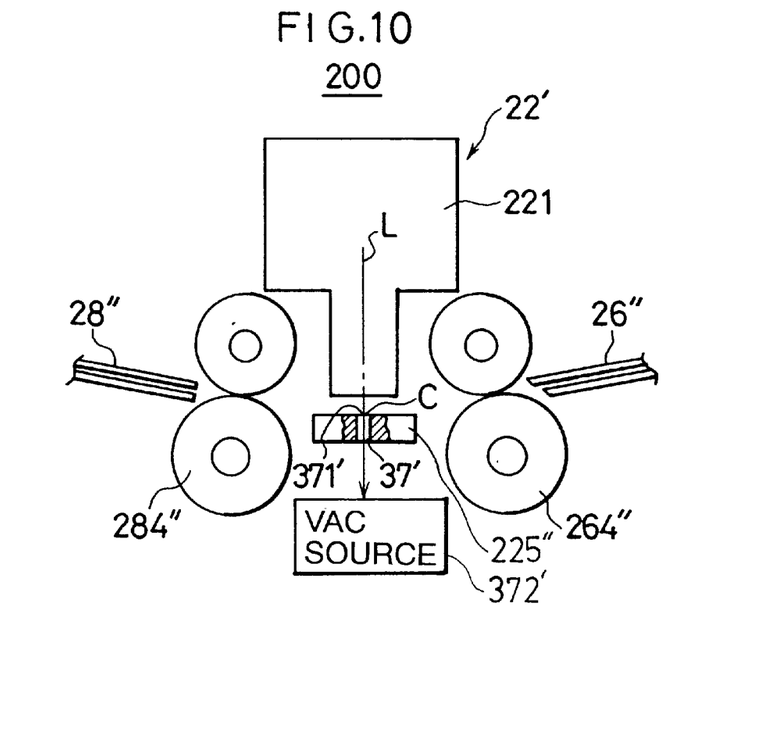
FIG. 10 is a diagram showing another variation of the image printing system shown in FIG. 7.

Furthermore, suction means 37' like a suction nozzle may be provided inside the positioning member 225" instead of the uplift-restraining member 38 in such a manner that a suction port 371' is located in the proximity of the point C of intersection of the surface of the positioning member 225" and the optical axis L as shown in FIG. 10. A negative pressure is supplied from a vacuum source 372' to the suction means 37', and the light-sensitive material P is sucked by the negative pressure and kept from lifting upward toward the exposure head 221. The suction port 371' of the suction means 37' may be separately provided on both the upstream and downstream sides of the point C of intersection.

Furthermore, although the first inclined portions 227, 227' are formed as integral part of the positioning members 225, 225' in the earlier-described first and second embodiments, it is possible to construct the first inclined portions 227, 227' as separate elements from the positioning members 225, 225', respectively. The positioning members 225, 225' are so called including the first inclined portions 227, 227' even when the first inclined portions 227, 227' are constructed as separate elements as described above.

Furthermore, although the first transfer paths 26, 26', 26" and the second transfer paths 28, 28', 28" are individually disposed at a slant to the exposure head 221 in the above-described first to third embodiments, it is possible to arrange the first transfer paths 26, 26', 26" and the second transfer paths 28, 28', 28" in a straight line in cases where the curl of the light-sensitive material P is not so large.

Furthermore, although a component formed of a PLZT device is used in the above-described first to third embodiments, it is possible to employ any type of component, such as a FOCRT (fiber-optic cathode ray tube), LED (light-emitting diode) array or fluorescent display tube, as long as it is capable of making line-by-line exposures.

As thus far described, an image exposure apparatus according to the invention comprises an exposure device for exposing a light-sensitive material line-by-line on an optical axis, a positioning member provided at a position facing said exposure device and having a projecting part situated on said optical axis on a side facing said exposure device, a first transfer path provided on an upstream side of said positioning member to transfer said light-sensitive material toward said positioning member, and a second transfer path provided on a downstream side of said positioning member to transfer said light-sensitive material having passed over said positioning member further downstream, where the projecting part of said positioning member is located on a side closer to said exposure device than the point of intersection of an extension of said first transfer path and said optical axis and the point of intersection of an extension of said second transfer path and said optical axis, and said positioning member has on its upstream side an inclined portion for guiding a forward end of said light-sensitive material transferred from said first transfer path onto said projecting part.

With this arrangement, the projecting part of the positioning member is located on the side closer to the exposure device than the point of intersection of the extension of the first transfer path and the optical axis and, therefore, a forward portion of the light-sensitive material which has been transferred by the first transfer path is brought into contact with the inclined portion on the upstream side of the positioning member, guided onto the projecting part and exposed by the exposure device.

Further, a rear portion of the light-sensitive material is situated on the side closer to the exposure device than the point of intersection of the extension of the second transfer path and the optical axis when the light-sensitive material which has been transferred by the first transfer path is passed to the second transfer path and transferred further downstream. Thus, the rear portion of the light-sensitive material is prevented from lifting toward the exposure device and held in contact with the projecting part so that the rear portion is exposed by the exposure device as it passes over the projecting part. As a consequence, it is possible to make proper exposures at both the forward and rear portions of the light-sensitive material even when it is curled.

The first and second transfer paths may be so disposed as to individually incline toward the aforementioned positioning member.

With this arrangement, the forward portion of the light-sensitive material which has been transferred from the first transfer path is always brought into contact with the inclined portion on the upstream side of the positioning member, guided onto the projecting part and exposed by the exposure device as the forward portion passes over the projecting part even when the light-sensitive material is significantly curled, because the forward portion has a large angle of approach with respect to the positioning member. Furthermore, when the light-sensitive material is transferred downstream by the second transfer path, the rear portion of the light-sensitive material is always held in contact with the projecting part and exposed by the exposure device as it passes over the projecting part, because the forward portion of the light-sensitive material has a large angle of departure with respect to the positioning member. Consequently, it is possible to make proper exposures at both the forward and rear portions of the light-sensitive material even when it is significantly curled.

Furthermore, there may be provided contact means for causing the light-sensitive material being transferred to come into contact with the aforementioned projecting part.

With this arrangement, the light-sensitive material being transferred by the first transfer path and the second transfer path is prevented from lifting toward the exposure device by the contact means and the entire light-sensitive material is reliably held in contact with the projecting part and, as a consequence, it is possible to make proper exposures also at a middle portion of the light-sensitive material other than its forward portion and rear portion in the same way as the forward and rear portions. In other words, it becomes possible to make proper exposures over the entire light-sensitive material.

Furthermore, the aforementioned contact means may be constructed of an extended part formed at an end of at least one of the first and second transfer paths.

With this arrangement, the light-sensitive material transferred by the first transfer path and the second transfer path is prevented from lifting toward the exposure device by the extended part formed at the end(s) of the transfer path(s) and the entire light-sensitive material is reliably held in contact with the projecting part, and as a consequence, it is possible to make proper exposures over the entire light-sensitive material including its forward and rear portions.

Furthermore, the aforementioned contact means may include roller(s).

With this arrangement, the light-sensitive material transferred by the first transfer path and the second transfer path is prevented from lifting toward the exposure device by the rollers and the entire light-sensitive material is reliably held in contact with the projecting part, and as a consequence, it is possible to make proper exposures over the entire light-sensitive material including its forward and rear portions.

Furthermore, the aforementioned contact means may include means for forcing the light-sensitive material toward the projecting part with the use of a blow-out force or a sucking force.

With this arrangement, the light-sensitive material transferred by the first transfer path and the second transfer path is prevented from lifting toward the exposure device by the means using the blow-out force or sucking force and the entire light-sensitive material is reliably held in contact with the projecting part. As a consequence, it is possible to make proper exposures over the entire light-sensitive material including its forward and rear portions.

Also, an image exposure apparatus according to the invention comprises an exposure device for exposing a light-sensitive material line-by-line on an optical axis, a positioning member provided at a position facing said exposure device, a first transfer path provided on an upstream side of said positioning member to transfer said light-sensitive material toward said positioning member, a second transfer path provided on a downstream side of said positioning member to transfer said light-sensitive material having passed over said positioning member further downstream, and uplift-restraining means for preventing said light-sensitive material from lifting from said positioning member toward said exposure device.

With this arrangement, the light-sensitive material transferred by the first transfer path and the second transfer path is kept from lifting from the positioning member toward the exposure device by the uplift-restraining means. As a result, the whole of the light-sensitive material is brought into contact with the positioning member, and proper exposures can be made over the entire light-sensitive material including its forward and rear portions with a simple construction.

The first and second transfer paths may be so disposed as to individually incline toward the aforementioned positioning member.

With this arrangement, the forward portion of the light-sensitive material which has been transferred from the first transfer path is reliably fed into a gap between the positioning member and the uplift-restraining means and exposed on the positioning member by the exposure device even when the light-sensitive material is significantly curled, because the forward portion has a large angle of approach with respect to the positioning member.

Furthermore, the rear portion of the light-sensitive material which has passed the positioning member is reliably fed into the second transfer path because the forward portion has a large angle of approach with respect to the positioning member. Consequently, it is possible to make proper exposures over the entire light-sensitive material including its forward and rear portions even when it is curled.

The aforementioned uplift-restraining means may be formed of a restraining member which is made of a light-transmitting material and disposed between the exposure device and the positioning member, wherein one side of the restraining member is directed to the positioning member is formed into a curved shape having a peak (extremity of swelling part) lying on the optical axis.

With this arrangement, the light-sensitive material transferred by the first transfer path and the second transfer path is kept from lifting toward the exposure device by the peak of the uplift-restraining means formed of the light-transmitting material. As a result, the whole of the light-sensitive material is brought into contact with the positioning member, and proper exposures can be made over the entire light-sensitive material including its forward and rear portions with a simple construction.

Furthermore, the aforementioned uplift-restraining means may include means for forcing the light-sensitive material toward the positioning member with the use of a blow-out force or a sucking force.

With this arrangement, the light-sensitive material transferred by the first transfer path and the second transfer path is prevented from lifting toward the exposure device by the means using the blow-out force or sucking force and the entire light-sensitive material is reliably held in contact with the projecting part. As a consequence, it is possible to make proper exposures over the entire light-sensitive material including its forward and rear portions with a simple construction.

INDUSTRIAL APPLICABILITY

Since an image exposure apparatus of the invention is constructed such that a projecting part of a positioning member is located on a side closer to an exposure device than either the point of intersection of an extension of a first transfer path and an optical axis or the point of intersection of an extension of a second transfer path and the optical axis and the positioning member has on its upstream side an inclined portion for guiding a forward portion of the light-sensitive material, which has been transferred from the first transfer path, onto the projecting part, it is possible to make proper exposures at both the forward and rear portions of the light-sensitive material even when it is curled.

Also, since an image exposure apparatus of the invention is provided with a positioning member which is located at a position facing an exposure device as well as uplift-restraining means for preventing a light-sensitive material from lifting toward said exposure device, it is possible to make proper exposures over the entire light-sensitive material including its forward and rear portions with a simple construction.

What is claimed is:

1. A light-sensitive material exposure apparatus comprising:
    an exposure device for exposing a light-sensitive material line by line on an optical axis;
    a positioning member provided at a position facing said exposure device and having a projecting part situated on said optical axis on a side facing said exposure device;
    a first transfer path provided on an upstream side of said positioning member to transfer the light-sensitive material toward said positioning member; and
    a second transfer path provided on a downstream side of said positioning member to transfer the light-sensitive material having passed over said positioning member further downstream;
    wherein the projecting part of said positioning member is located on a side closer to said exposure device than an intersection between a line extended from said first transfer path and said optical axis and an intersection between a line extending from said second transfer path and said optical axis, and said positioning member has on its upstream side an inclined portion for guiding a forward end of the light-sensitive material transferred from said first transfer path onto said projecting part.

2. A light-sensitive material exposure apparatus as recited in claim 1, wherein said first and second transfer paths are inclined toward said positioning member.

3. A light-sensitive material exposure apparatus as recited in claim 1, further comprising contact means for causing the light-sensitive material being transferred to come into contact with said projecting part.

4. A light-sensitive material exposure apparatus as recited in claim 3, wherein said contact means includes an extended part formed at an end of at least one of said first and second transfer paths.

5. A light-sensitive material exposure apparatus as recited in claim 4, wherein said extended part is bent in a direction toward said exposure device.

6. A light-sensitive material exposure apparatus as recited in claim 3, wherein said contact means includes a roller.

7. A light-sensitive material exposure apparatus as recited in claim 3, wherein said contact means includes means for forcing the light-sensitive material toward said projecting part using a blow-out force or a suction force.

8. A light-sensitive material exposure apparatus as recited in claim 3, wherein said contact means comprise at least one jet nozzle through which fluid is directed toward said projecting part to prevent lifting of the light-sensitive material upward from said projecting part.

9. A light-sensitive material exposure apparatus as recited in claim 3, wherein said contact means comprise a suction port arranged in said projecting part and communicating with a source of negative pressure.

10. A light-sensitive material exposure apparatus as recited in claim 1, wherein said first transfer path comprises a lower guide plate and an upper guide plate opposed to said lower guide plate and extending beyond said lower guide plate at an end proximate said positioning member, further comprising a flexible sheet element attached to said positioning member and in contact with said upper guide plate, said flexible sheet element being arranged below said upper guide plate at a location where said upper guide plate extends beyond said lower guide plate.

11. A light-sensitive material exposure apparatus as recited in claim 1, wherein said first transfer path comprises a lower guide plate and an upper guide plate opposed to said lower guide plate, further comprising a protective element attached to an inner surface of said upper guide plate to protect a light-sensitive surface of the light-sensitive material during passage in said first transfer path.

12. A light-sensitive material exposure apparatus as recited in claim 1, wherein said second transfer path comprises a lower guide plate and an upper guide plate opposed to said lower guide plate and extending beyond said lower guide plate at an end proximate said positioning member, further comprising a flexible sheet element attached to said positioning member and in contact with said upper guide plate, said flexible sheet element being arranged below said upper guide plate at a location where said upper guide plate extends beyond said lower guide plate.

13. A light-sensitive material exposure apparatus as recited in claim 1, wherein said second transfer path comprises a lower guide plate and an upper guide plate opposed to said lower guide plate, further comprising a protective element attached to an inner surface of said upper guide plate to protect a light-sensitive surface of the light-sensitive material during passage in said second transfer path.

14. A light-sensitive material exposure apparatus as recited in claim 1, wherein said positioning member has a symmetrical shape.

15. A light-sensitive material exposure apparatus as recited in claim 1, wherein said positioning member has on its downstream side an inclined portion adjacent said projecting part.

16. A light-sensitive material exposure apparatus comprising:
an exposure device for exposing a light-sensitive material line-by-line or as a succession of a few lines;
a positioning member provided at a position facing said exposure device to support a portion of the light-sensitive material at its exposure position;
a first transfer path provided on an upstream side of said positioning member to transfer the light-sensitive material toward said positioning member;
a second transfer path provided on a downstream aide of said positioning member to transfer the light-sensitive material having passed over said positioning member further downstream; and
a restraining member formed of a light-transmitting material and disposed between said exposure device and said positioning member, one side of said restraining member facing said positioning member having a curved convex shape with a peak opposite to the exposure position.

17. A light-sensitive material exposure apparatus comprising:
an exposure device for exposing a light-sensitive material line-by-line or as a succession of a few lines:
a positioning member provided at a position facing said exposure device to support a portion of the light-sensitive material at its exposure position;
a first transfer path provided on an upstream side of, said positioning member to transfer the light-sensitive material toward said positioning member;
a second transfer path provided on a downstream side of said positioning member to transfer the light-sensitive material having passed over said positioning member further downstream; and
means for forcing the light-sensitive material toward said positioning member with the use of a blow-out or a suction force.

18. A light-sensitive material exposure apparatus as recited in claim 17, wherein said means for forcing the light-sensitive material toward said positioning member comprise at least one jet nozzle through which fluid is directed toward said projecting member to prevent lifting of the light-sensitive material upward from said projecting member.

19. A light-sensitive material exposure apparatus as recited in claim 17, wherein said means for forcing the light-sensitive material toward said positioning member comprise a suction port arranged in said projecting member and communicating with a source of negative pressure.

20. A light-sensitive material exposure apparatus, comprising:
an exposure device for exposing a light-sensitive material line-by-line or as a succession of a few lines;
a positioning member provided at a position facing said exposure device to support a portion of the light-sensitive material at its exposure position;
a first transfer path provided on an upstream side of &aid positioning member to transfer the light-sensitive material toward said positioning member;
a second transfer path provided on a downstream side of said positioning member to transfer the height-sensitive material having passed over said positioning member further downstream; and
a restraining device for urging the portion of the light-sensitive material under exposure against the positioning member;
wherein said first and second transfer paths incline towards said positioning member and extend close to said positioning member to operate as said retraining device.

21. A light-sensitive material exposure apparatus, comprising:
an exposure device for exposing a light-sensitive material line-by-line or as a succession of a few lines;
a positioning member provided at a position facing said exposure device to support a portion of the light-sensitive material at its exposure position;

a first transfer path provided on an upstream side of said positioning member to transfer the light-sensitive material toward said positioning member;

a second transfer path provided on a downstream side of said positioning member to transfer the light-sensitive material having passed over said positioning member farther downstream; and a restraining device for urging the portion of the light-sensitive material under exposure against the positioning member;

wherein said positioning member includes a projection projecting toward said exposure device, and said first and second transfer paths incline toward said positioning member such that imaginary extensions of the transfer paths intersect said projector under a top of said projection.

22. A light-sensitive material exposure apparatus as recited in claim 21, wherein said positioning member includes guide surfaces on the upstream and downstream sides of said projection.

23. A light-sensitive material exposure apparatus, comprising:

an exposure device for exposing a light-sensitive material line-by-line or as a succession of a few lines;

a positioning member provided at a position facing said exposure device to support a portion of the light-sensitive material at its exposure position;

a first transfer path provided on an upstream side of said positioning member to transfer the light-sensitive material toward said positioning member;

a second transfer path provided on a downstream side of said positioning member to transfer the light-sensitive material having passed over said positioning member further downstream; and a restraining device for urging the portion of the light-sensitive material under exposure against the positioning member;

wherein said restraining device includes a pair of urging members positioned close to the exposure position, respectively on the upstream side and downstream side of the exposure position.

24. An image printing apparatus, comprising:

a light-sensitive material feeder for feeding a light-sensitive material an exposure device for exposing a light-sensitive material line-by-line or as a succession of a few lines;

a positioning member provided at a position facing said exposure device to support a portion of the light-sensitive material at its exposure position;

a first transfer path provided on an upstream side of said positioning member to transfer toward said positioning member the light-sensitive material fed by said light-sensitive material feeder;

a restraining device for urging a portion of the light-sensitive material under exposure against said positioning member;

a second transfer path provided on a downstream side of said positioning member to transfer, further downstream the light-sensitive material having passed over said positioning member; and a developing section for developing the light-sensitive material transferred through the second transfer path;

wherein said first and second transfer paths incline towards said positioning member and extend close to said positioning member to operate as said retraining device.

25. An image printing apparatus, comprising:

a light-sensitive material feeder for feeding a light-sensitive material an exposure device for exposing a light-sensitive material line-by-line or as a succession of a few lines;

a positioning member provided at a position facing said exposure device to support a portion of the light-sensitive material at its exposure position;

a first transfer path provided on an upstream side of said positioning member to transfer toward said positioning member the light-sensitive material fed by said light-sensitive material feeder;

a restraining device for urging a portion of the light-sensitive material under exposure against said positioning member;

a second transfer path provided on a downstream side of said positioning member to transfer, further downstream, the light-sensitive material having passed over said positioning member; and a developing section for developing the light-sensitive material transferred through the second transfer path;

wherein said positioning member includes a projection projecting toward said exposure device, and said first and second transfer paths incline toward said positioning member such that imaginary extensions of said first and second transfer paths intersect said projection under a top of said projection.

26. An image printing apparatus, comprising:

a light-sensitive material feeder for feeding a light-sensitive material an exposure device for exposing a light-sensitive material line-by-line or as a succession of a few lines;

a positioning member provided at a position facing said exposure device to support a portion of the light-sensitive material at its exposure position;

a first transfer path provided on an upstream side of said positioning member to transfer toward said positioning member the light-sensitive material fed by said light-sensitive material feeder;

a restraining device for urging a portion of the light-sensitive material under exposure against said positioning member;

a second transfer path provided on a downstream side of said positioning member to transfer, further downstream, the light-sensitive material having passed over said positioning member; and a developing section for developing the light-sensitive material transferred through the second transfer path;

wherein said restraining device including a pair of urging members positioned close to the exposure position, respectively on the upstream side and downstream side of the exposure position.

* * * * *